United States Patent [19]

Farr

[11] 4,097,754

[45] Jun. 27, 1978

[54] SHORT PITCH ALTERNATOR

[75] Inventor: James B. Farr, Ann Arbor, Mich.

[73] Assignee: Tecumseh Products Company, Tecumseh, Mich.

[21] Appl. No.: 734,117

[22] Filed: Oct. 20, 1976

[51] Int. Cl.² ............................................. H02K 21/12
[52] U.S. Cl. ............................. 310/67 R; 310/156; 310/168; 310/68 D; 322/58
[58] Field of Search ...................... 322/58; 310/156, 67, 310/153, 155, 269, 168, 172, 198, 202–207, 68 R, 68 B, 68 D

[56] References Cited

U.S. PATENT DOCUMENTS

| | | | |
|---|---|---|---|
| 3,219,859 | 11/1965 | Terry et al. | 310/155 |
| 3,290,525 | 12/1966 | Sudmeier | 310/153 |
| 3,482,131 | 12/1969 | Lytle | 310/156 |
| 3,860,843 | 1/1975 | Kawasaki et al. | 310/156 X |

OTHER PUBLICATIONS

*Electric Machinery,* Kingsley et al., McGraw-Hill, 1971, pp. 603–604.

*Primary Examiner*—Donovan F. Duggan
*Attorney, Agent, or Firm*—Albert L. Jeffers; Roger M. Rickert

[57] ABSTRACT

A three-phase permanent magnet alternator is disclosed employing a fractional pitch stator winding of about two-thirds or 120 electrical degrees for minimizing third harmonic circulating current in the phase windings. The alternator has a rotor supporting permanent magnet poles and a slotted stator having coils disposed in the slots with the pitch of each coil being less than the rotor pole pitch and the coils of each phase connected in series to form a fractional pitch phase winding. The rotor circumscribes the stator and the permanent magnet poles have an arcuate extent nearly as great as the rotor pole pitch.

10 Claims, 5 Drawing Figures

SHORT PITCH ALTERNATOR

CROSS REFERENCE TO RELATED APPLICATIONS

This application is related to my copending application Serial No. 734,116, filed on even date herewith for "ELECTROMECHANICAL DEVICE", assigned to the assignee of the present invention and the entire disclosure of which is specifically incorporated herein by reference.

BACKGROUND OF THE INVENTION

The present invention relates generally to rotating dynamoelectric machines and more particularly to an improved winding arrangement for such machines which may, for example, be particularly useful in a vehicle alternator.

Alternators for a vehicular environment are typified by U.S. Pat. Nos. 3,034,005 and 3,493,800. Perhaps the most commonly encountered alternator has a stationary stator member of the laminated variety with windings disposed in stator slots in which an electric voltage is to be induced by rotation of a magnetic field. The rotating magnetic field is commonly electromagnetically generated by supplying direct current to field producing coils on the rotor by means of slip rings.

As illustrated by the afore-mentioned two United States Patents, the stator windings may be of the three-phase type and permanent magnets may be substituted for the commonly employed electromagnets. It is also known to revolve the permanent magnet field about the exterior portion of a three-phase stator assembly. A three-phase delta connection allows a rather large third harmonic circulating current to occur with its resultant heating of the windings and alternator inefficiency.

Standard alternator design often includes pole shaping for the purpose of obtaining a flux pattern which will cause generation of approximately sinusoidal wave forms. Such pole shaping may not always be desirable because of economic or other considerations. Alternators which use permanent magnets directly as the rotor poles is an example of a case where pole shaping is not desirable. Use of a full pitch winding on an alternator without pole shaping, that is, without wave form shaping will result in the generation of a phase voltage which is high in harmonic content. The high harmonic phase voltages are unsuitable for use with delta-connected phases because of circulating currents or with wye-connected phases because of nonconstructive addition of the phase voltages. The short pitch alternator in this application provides for the generation of phase voltages which are low in harmonic voltages solely by means of short pitch stator windings. The phase voltage so generated allows delta or wye-connections of the windings without losses from circulating current in the case of delta-connection and with constructive addition of the phase voltages in the case of wye-connected phases.

A further advantage obtained for the short pitch stator winding is the reduction of winding resistance as a result of reduced mean turn length.

SUMMARY OF THE INVENTION

Among the several objects of the present invention may be noted the provision of an alternator having a fractional pitch winding; the provision of a delta-connected three-phase alternator winding which minimizes circulating current losses; the provision of a wye-connected three-phase alternator winding which minimizes non-additive harmonics in the phase voltages; the provision of an alternator having a coil pitch of two-thirds or 120 electrical degrees; and the provision of an efficient and economical permanent magnet alternator.

In general, this three-phase alternating current generator has first and second relatively rotatable portions with a specified number of permanent magnet poles disposed about one portion while the other portion comprises a slotted magnetic core carrying a predetermined number of coils with the coils of each phase connected in series to form a three-phase winding. For $n$ magnetic poles and $3n$ core slots, $3n$ coils may each embrace a pair of stator teeth. The coil pitch of about two-thirds and the minimization of third harmonic content may thereby be achieved.

Also in general, and in one form, a three-phase alternating current generator having a rotor supporting permanent magnet poles and a slotted stator having coils disposed in its slots with the pitch of each coil being less than the rotor pole pitch and with the coils of each phase connected in series to form a fractional pitch three-phase winding, facilitates the connection of those three-phase windings in a delta configuration with minimized losses due to circulating current or in a wye configuration with minimization of nonadditive harmonics in the generated phase voltages.

BRIEF DESCRIPTION OF THE DRAWINGS

In the several drawing views like reference numerals identify like parts. The following is illustrative of the invention in one form and is not to be construed as limiting in any manner.

DESCRIPTION OF THE PREFERRED EMBODIMENT

Figure 1:
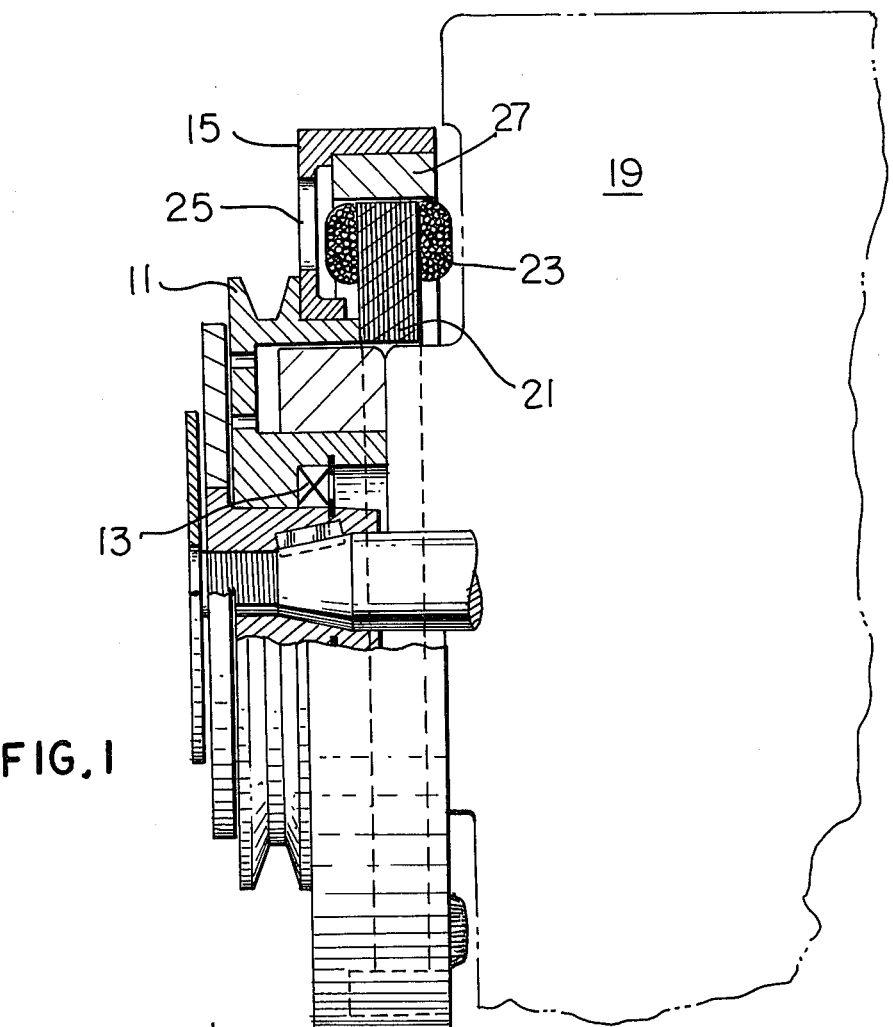
FIG. 1 is a side view, partially in cross-section, of an electromechanical device which may embody the present invention in one form.

In FIG. 1, an electromechanical device of the type disclosed in my afore-mentioned copending application, which may employ the principles of the present invention, is illustrated. Pulley 11 may be V-belt driven, for example, by a vehicle engine, and be supported for rotation on a bearing 13. Flywheel 15 rotates with pulley 11 and in conjunction with a plurality of permanent magnets, such as 27, which are bonded to the interior rim of flywheel 15, constitutes an alternator rotor having permanent magnet poles. Slotted stator core 21 is fixedly attached to housing 19 concentric with flywheel 15 and has coils 23 disposed in the stator slots. Air passing apertures such as 25 may be provided in flywheel 15 for allowing air to circulate about the alternator windings 23 for cooling purposes.

Figure 2:
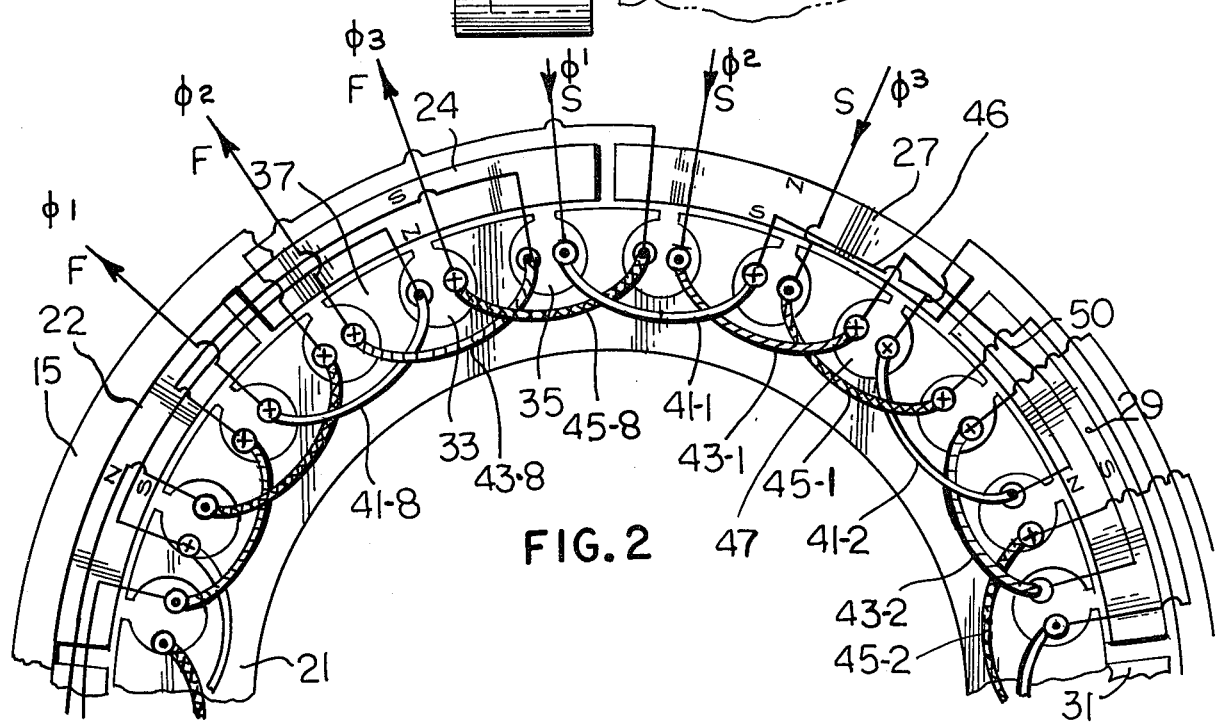
FIG. 2 is a partial, schematic end view of a stator, magnetic poles and phase winding coils illustrating the present invention.

FIG. 2 is an end view of portions of the alternator of FIG. 1 in somewhat schematic form. Several permanent magnet poles 22, 24, 27, 29 and 31 are illustrated mounted on flywheel 15 and would, during alternator operation, rotate about the stator core 21 in unison. FIG. 2 illustrates a portion of an alternator having eight such magnetic poles and 24 slots in core 21, such as 33 and 35, and also having twenty-four teeth such as 37 defined between each adjacent pair of slots 33, 35. Stator coils 41, 43 and 45 are respectively coils of winding phases 53, 55, 57 (FIG. 4) and are illustrated as single turn coils with the conventional plus sign indicating current flow toward the drawing and a dot indicating current flow toward the observer, and with "S" indicating the starting end and "F" the finishing end of each winding. In practice, numerous turns would be employed in each coil and in one specific embodiment, for example, about 20 turns per coil could be used.

The eight magnetic rotor poles provide alternate north and south poles at the periphery of the stator core 21 and each may, for example, be a ceramic type magnet extending arcuately for around two and a half inches and being about one inch long and a quarter of an inch thick and having their north, south axes across this quarter inch thickness, as illustrated in FIG. 2. It will be understood that to form a practical machine, there must be an even number of rotor poles.

Figure 3A:
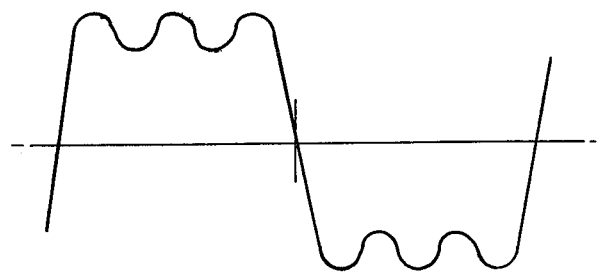
FIG. 3a and 3b illustrate phase voltage wave forms for full coil pitch and two-thirds coil pitch, respectively.

Pole pitch, whether it be measured in arcuate distance, mechanical angle or electrical degrees, is the distance between the center lines of adjacent north and south poles. Thus, for the illustrated configurations in FIG. 2, the pole pitch is slightly under 2½ inches or since an eight pole machine is illustrated, this pole pitch could be expressed as 45 mechanical degrees; pole pitch is always 180 electrical degrees. Coil pitch measures the distance between two sides of a coil and may similarly be expressed as an arcuate distance, as a fraction of pole pitch, or in electrical or mechanical degrees. Standard alternator design, as exemplified by the previously mentioned two United States Patents, is to have full pitch coils which in FIG. 2 would mean that one side of a coil would, for example, be disposed in slot 35, while the other side of that same coil would be disposed in slot 47. With such a full coil pitch, each coil would span two slots intermediate of the slots in which it is disposed, and for a three-phase arrangement only the sides of coils of the same phase would be present in any given slot. Assuming such a full coil pitch arrangement, operation of the alternator will generate a phase voltage somewhat as illustrated in FIG. 3a. In FIG. 3a, it will be observed that in addition to a substantial fundamental frequency, a very substantial third harmonic component is present. If in addition the full coil pitch alternator were delta-connected, the third harmonic component in each of the three-phase windings would be in phase with that same third harmonic component in the other windings, and a very substantial third harmonic current component would thus circulate in the delta with resultant heating losses and other problems. As a result, full coil pitch threephase alternators are generally wye-connected in order to avoid circulating current. Even with the wye connections these third harmonic signals do not add beneficially.

Figure 3B:
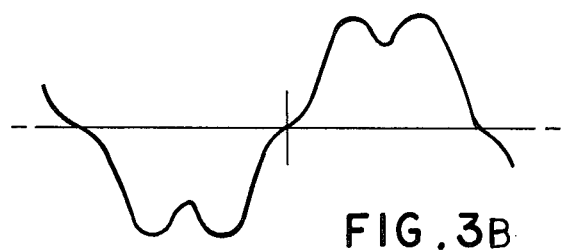

Fractional pitch windings are known and in theory if the pitch is reduced from full pitch by 1/n, the nth harmonic will be balanced out. Thus, to eliminate the third harmonic for the illustrated 24 slot stator, the coil should span one less slot, this being a reduction of one-third in the coil pitch or an actual coil pitch of two-thirds or 120 electrical degrees. This coil pitch is illustrated for the coils 41, 43 and 45 of windings 53, 55 and 57 in FIG. 2. The phase voltage wave form for the two-thirds pitch arrangement is illustrated in FIG. 3b, and it will be noted that this wave form has a substantially lesser third harmonic component than the full pitch wave form illustrated in FIG. 3a. In general, to obtain a coil pitch of 120 electrical degrees in a machine having n poles, a slotted magnetic core having 3n slots defining 3n corresponding teeth, and carrying 3n coils with each coil disposed about an adjacent pair of teeth, is sufficient.

To form a phase winding from the coils illustrated in FIG. 2, every third coil is connected in series, and with a polarity such that their voltages are additive. Thus, as illustrated in FIG. 2, coil 41-1 would be connected in series with coil 41-2 by interconnecting lead 46 with coil 41-1 being disposed in its respective slots in a clockwise sense, and coil 41-2 disposed or wound in its slots in a counterclockwise sense so that their respective voltages add. Similarly, coil 43-1 would be connected in series with coil 43-2, by interconnecting lead 50 and coil 45-1 would be connected in series with coil 45-2. This sequence would be repeated about the stator and for the exemplary 24 slot stator, every third coil or a total of eight coils, would be connected together in series to form each phase winding.

Figure 4:
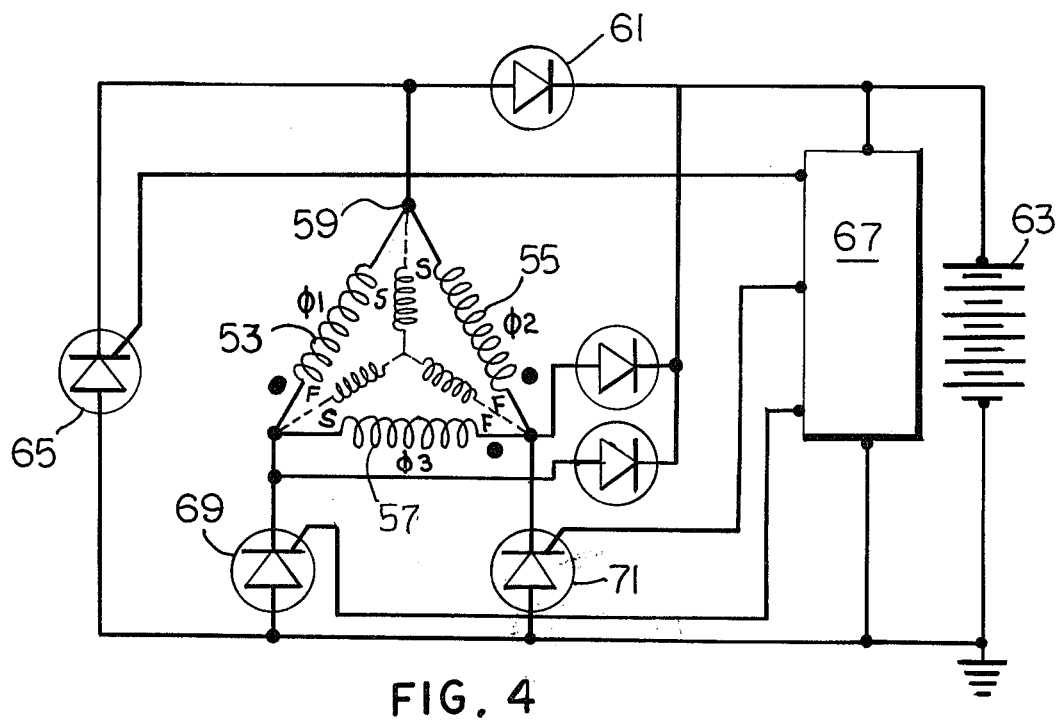
FIG. 4 is an electrical schematic diagram, partially in block form, illustrating one electrical arrangement for the alternator of the present invention.

A 12.5 volt alternator using a laminated stator core 21, like that illustrated in FIG. 2, has been constructed employing about 20 turns per coil of number 16 wire, and a two-thirds coil pitch and this arrangement provided an alternator with a phase resistance of around one-fourth to one-half ohm and a phase inductance of around 1 Mh, suitable for charging a 12 volt storage battery 63 in the manner illustrated in FIG. 4.

Three phase windings 53, 55 and 57 are delta-connected in FIG. 4 with each delta junction, such as 59, connected by way of a diode, such as 61, to the positive terminal of storage battery 63. The wye connection of the windings as an alternate is suggested by the dotted lines. Each winding or delta junction 59 is also coupled to the cathode of a silicon controlled rectifier, such as 65, the anode of which is connected to the negative side of storage battery 63. A voltage regulating circuit 67 may sense the voltage across battery 63 and provide appropriate gating signals to the three silicon controlled rectifiers 65, 69 and 71 appropriately to gate those silicon controlled rectifiers into their conducting state so long as the battery voltage remains below a specified "full charge" level, and when that voltage level is reached, the voltage regulating circuit 67 prevents further conduction by the three silicon controlled rectifiers, thus stopping the battery charging operation and causing the alternator stator to operate without load. If the voltage regulating feature is not desired, voltage regulating circuit 67 may be eliminated and the silicon controlled rectifiers 65, 69 and 71 replaced by diodes in the same respective directions of conduction. Circuitry for a wye-connected alternator would be very similar to the circuit illustrated.

Thus, while the present invention has been described with respect to a specific preferred embodiment, numerous modifications will readily suggest themselves to those of ordinary skill in the art. For example, a two-thirds coil pitch has been illustrated as desirable for substantially reducing third harmonic phase voltage content, however, other coil pitches less than 180 electrical degrees may provide substantial operating improvement, and accordingly the scope of the present invention is to be measured only by that of the appended claims.

What is claimed is:

1. A three-phase alternating current generator having first and second relatively rotatable portions, an even number of $n$ magnetic poles disposed on the first portion, the second portion comprising a slotted magnetic core having $3n$ slots respectively defining teeth therebetween, $3n$ coils, each coil being disposed about an adjacent pair of teeth and every third coil being connected in series to form a phase winding, there being three-phase windings each formed of a different group of $n$ coils.

2. The generator of claim 1 wherein said poles are permanent magnets, the second portion being stationary and comprising an annular laminated member.

3. The generator of claim 2 wherein the first portion is concentric with and rotatable about the second portion.

4. The generator of claim 1 wherein $n = 8$.

5. The generator of claim 1 wherein the coil pitch is about 120 electrical degrees thereby minimizing third harmonic current in the windings.

6. The generator of claim 1 wherein the rotor circumscribes the stator with the permanent magnet poles having an arcuate extent nearly as great as the rotor pole pitch.

7. The generator of claim 1 wherein each permanent magnet pole has a pitch which is greater than the pitch of each coil and which is less than the rotor pole pitch.

8. The generator of claim 1 wherein the three-phase windings are connected together in delta configuration.

9. The generator of claim 1 wherein the three-phase windings are connected together in a wye configuration.

10. An alternating current generator having a rotor supporting an even number of permanent magnet poles defining a given pole pitch, and a slotted stator having coils disposed in the slots thereof, the pitch of each coil being less than the rotor pole pitch, every third coil being connected in series to form a fractional pitch phase winding, there being three phase windings connected together in a configuration to form a three-phase generator, and wherein there are $n$ magnetic poles disposed about the rotor, $3n$ slots substantially uniformly disposed about the stator and $3n$ coils, each coil having one side disposed in a specified slot and its other side disposed in a slot spaced from the specified slot by one slot, alternate slots having one side of a coil of a first phase and one side of a coil of a second phase therein, the slots intermediate said alternature slots having one side of a coil of said second phase and one side of a coil of the third phase therein.

* * * * *